(12) United States Patent
Schmed et al.

(10) Patent No.: US 7,856,920 B2
(45) Date of Patent: Dec. 28, 2010

(54) COFFEE MAKER FOR BREWING COFFEE POWDER CONTAINED IN A CARTRIDGE

(75) Inventors: Arthur Schmed, Wollerau (CH); Gianni Remo, Pistoia (IT)

(73) Assignee: SAECO International Group, S.p.A., Gaggio Montano (IT)

( * ) Notice: Subject to any disclaimer, the term of this patent is extended or adjusted under 35 U.S.C. 154(b) by 596 days.

(21) Appl. No.: 11/034,507

(22) Filed: Jan. 13, 2005

(65) Prior Publication Data

US 2005/0150391 A1 Jul. 14, 2005

(30) Foreign Application Priority Data

Jan. 14, 2004 (DE) .................. 10 2004 002 004

(51) Int. Cl.
*A47J 31/00* (2006.01)
(52) U.S. Cl. .................. 99/295; 99/289 R; 99/302 R; 99/305
(58) Field of Classification Search .................. 99/295, 99/289 R, 302 R, 305
See application file for complete search history.

(56) References Cited

U.S. PATENT DOCUMENTS

| 3,404,616 | A | 10/1968 | Lampe |
| 3,537,384 | A | 11/1970 | Stauber |
| 4,583,449 | A | 4/1986 | Dangel et al. |
| 5,325,765 | A | 7/1994 | Sylvan et al. |
| 5,440,972 | A * | 8/1995 | English ................. 99/282 |
| 5,598,764 | A * | 2/1997 | Bambi ................. 99/295 |
| 6,142,063 | A | 11/2000 | Beaulieu et al. |
| 6,240,832 | B1 | 6/2001 | Schmed et al. |
| 6,655,260 | B2 * | 12/2003 | Lazaris et al. ............. 99/295 |
| 6,740,345 | B2 * | 5/2004 | Cai ................. 426/77 |
| 6,763,759 | B2 * | 7/2004 | Denisart ............. 99/302 P |
| 6,829,981 | B2 * | 12/2004 | Lassota ................. 99/299 |
| 7,021,197 | B2 * | 4/2006 | Chen et al. ............. 99/291 |
| 2002/0048621 | A1 * | 4/2002 | Boyd et al. ............. 426/77 |
| 2002/0129712 | A1 | 9/2002 | Westbrook et al. |
| 2003/0145736 | A1 | 8/2003 | Green |

FOREIGN PATENT DOCUMENTS

| DE | 30 00 105 | 7/1986 |
| EP | 1247756 A1 | 9/2002 |
| JP | 2003-316724 | 11/2000 |
| JP | 2001-061663 | 3/2001 |
| JP | 2003-024703 | 1/2003 |
| WO | 03/059778 A2 | 7/2003 |

* cited by examiner

*Primary Examiner*—Reginald L Alexander

(57) ABSTRACT

The coffee maker for brewing powder coffee contained in a cartridge comprises a brewing chamber adapted to receive the cartridge, at least one punching member for punching the cartridge and a pump for feeding brewing water into the brewing chamber. In order to avoid that the prepared coffee shows froth at its surface, the coffee maker comprises means for restricting the amount of water fed by the pump into the brewing chamber per unit of time. This means ensures that the brewing water flows through the cartridge essentially unpressurized.

11 Claims, 2 Drawing Sheets

COFFEE MAKER FOR BREWING COFFEE POWDER CONTAINED IN A CARTRIDGE

BACKGROUND OF THE INVENTION

The present invention refers to a coffee maker for brewing coffee powder contained in a cartridge, comprising a brewing chamber adapted to receive a coffee powder cartridge, at least one means for punching the coffee powder cartridge, and a pump for feeding hot brewing water into the brewing chamber.

Coffee makers of this kind are used predominantly in homes, i.e. are designed for household use. As compared to conventional coffee makers with a grinder for grinding whole coffee beans, a fundamental advantage of the above mentioned coffee maker may be seen in the fact that a qualitatively high grade coffee beverage can be prepared by using pre-packed coffee powder cartridges, the more so as the coffee powder is optimally ground and kept in the cartridge in an airtight manner. Moreover, such coffee makers are less subject to contamination by coffee powder.

For brewing the coffee powder contained in the cartridge, either manually operated or semi-automatic as well as fully automatic coffee makers are used. Usually, in a manually operated coffee maker, the cartridge is inserted into a cartridge holder that in turn is inserted into the coffee maker. In the semi-automatic coffee makers, the cartridge is inserted into a cartridge retainer or directly into the brewing chamber of the machine, whereby the brewing chamber is manually closed by means of a central lever mechanism. In a fully automatic coffee maker, however, the cartridge is removed from a cartridge magazine and automatically inserted into the brewing chamber; after the brewing operation, the cartridge is removed from the brewing chamber and discarded into a trash receptacle without any intervention of the operator.

All these above mentioned species of coffee maker usually comprise a hollow so-called brewing spike provided with radial outlet openings for injecting brewing water into the cartridge that is also adapted to punch the bottom and the cover, respectively, of the cartridge. Also known are manually operated coffee makers in which the cartridge retainer is provided with a plurality of embossments located on an outlet grate; these embossments break open the cover of the cartridge as soon as brewing water is injected into the cartridge from the opposite side thereof and the cartridge is pressed against the embossments under the influence of the hydraulic overpressure created by the pressurized brewing water. During the subsequent brewing operation, the brewing water is injected into the cartridge by means of the brewing spike, with the result that is flows under pressure through the coffee powder contained in the cartridge and escapes from the cartridge through the opening created by the embossments.

Independent of the fact whether it is a manually operated coffee maker or a semi-automatic or a fully automatic machine, the coffee maker is designed and adapted to the cartridge so as to produce a coffee beverage having froth on its surface; that froth usually is considered as a characteristic of a good coffee beverage.

Even if great efforts have been taken to ensure that the prepared coffee beverage has durable froth on its surface, in certain countries the desire arises to prepare also conventional coffee in the sense of a filter coffee by means of these coffee makers. In place of the expression "filter coffee", also the expression "gentle coffee" is used.

PRIOR ART

U.S. Pat. No. 5,325,765 discloses a beverage filter cartridge including an impermeable pierceable base having a predetermined shape and an opening at one end. A self-supporting wettable filter element is disposed in the base. It sealingly engages with the opening in the base and has a form different and smaller than the predetermined shape of the base so that the filter element diverges from the base and divides the base into two sealed chambers, namely a first chamber for storing an extract of the beverage to be made, and a second empty chamber for accessing the beverage after the beverage outflow from the filter has been made by combining a liquid with the extract. Further, it comprises an impermeable pierceable cover sealingly engaged with the opening in the base to form an impermeable cartridge. For extracting the coffee powder, the cartridge is punched at both sides by means of an upper and a lower punching member. The lower punching member is eccentrically arranged such that it extends into the second chamber between the base and the filter element without damaging the filter element. Pressurized brewing water is fed into the cartridge through the upper punching member. It passes through the coffee powder and the filter element and enters the second chamber. Therefrom, it flows through the lower punching element into a beverage container.

U.S. Pat. No. 3,537,384 discloses a steam and water preparing machine, especially for preparing coffee and tea beverages. It comprises a pump unit and a subsequent boiler. A removable filter head is provided for receiving coffee powder. The pump is designed such that it discharges a constant volume of water per revolution, independent of the inner resistance of the filter head, resulting in an exactly predetermined water amount of a predetermined temperature to be fed through the coffee powder contained in the filter head. By varying the flow rate of the pump and/or the heat output of the boiler, the temperature of the brewing water is said to be changed such that either a conventional coffee beverage or an espresso coffee beverage can be prepared, because different flavoring agents are dissolved by different temperature levels. Particularly, it is noted that steam with a temperature of 110° C. has to be used for preparing an espresso coffee beverage in order to dissolve particularly the bitter flavoring agents contained in the coffee powder.

U.S. Pat. No. 4,583,449 discloses a coffee percolator for selectively making normal coffee or espresso. It comprises a water flow path extending between a cold water supply inlet and a brewing unit. The flow path is divided into a first branch including a pressure pump, and a second branch including a valve adapted to close or be closed in the espresso making mode. It further comprises control means for activating the valve(s) and/or the pump in response to the selection of the type of coffee to be made. The flow path is employed in common for the water used for making espresso and normal coffee, and is only divided adjacent the pump into the first flow path branch including the pump and the second flow path branch forming a bypass across the pump.

OBJECTS OF THE INVENTION

It is an object of the present invention to provide a coffee maker for brewing coffee powder contained in a cartridge by means of which not only an espresso coffee beverage, but also a normal coffee beverage can be prepared, the latter one not having froth on its surface and corresponding in taste to a normal filter coffee.

SUMMARY OF THE INVENTION

To meet this and other objects, the invention provides a coffee maker for brewing coffee powder contained in a cartridge, comprising a brewing chamber adapted to receive the coffee powder cartridge, at least one means for punching the coffee powder cartridge, and a pump for feeding hot brewing water into the brewing chamber. Further, means are provided for restricting the amount of brewing water fed into the brewing chamber per unit of time to such an extent that the brewing water flows through the powder coffee cartridge received in the brewing chamber essentially unpressurized.

Due to the fact that means are provided for restricting the amount of brewing water fed into the brewing chamber per unit of time to such an extent that the brewing water flows through the powder coffee cartridge received in the brewing chamber essentially unpressurized, the formation of froth on the surface of the coffee beverage can be essentially avoided. Preferably, both the cover and the bottom of the cartridge are punched before the brewing operation is initiated.

BRIEF DESCRIPTION OF THE DRAWINGS

In the following, an embodiment of the coffee maker according to the invention will be further described, with reference to the accompanying drawings, in which.

DETAILED DESCRIPTION OF A PREFERRED EMBODIMENT

Figure 1:
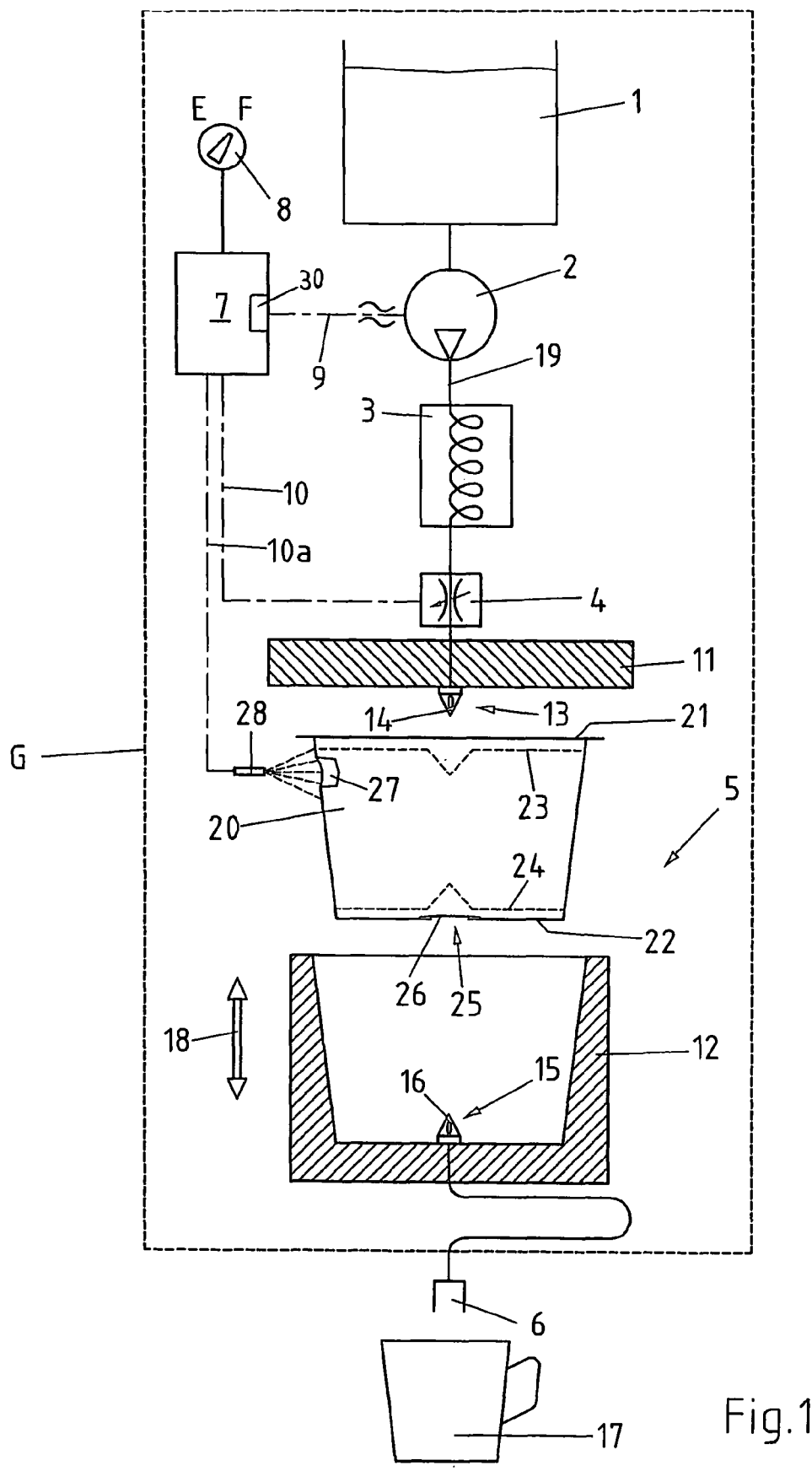
FIG. 1 shows a schematic diagram of a coffee maker with its brewing chamber open.
Figure 2:
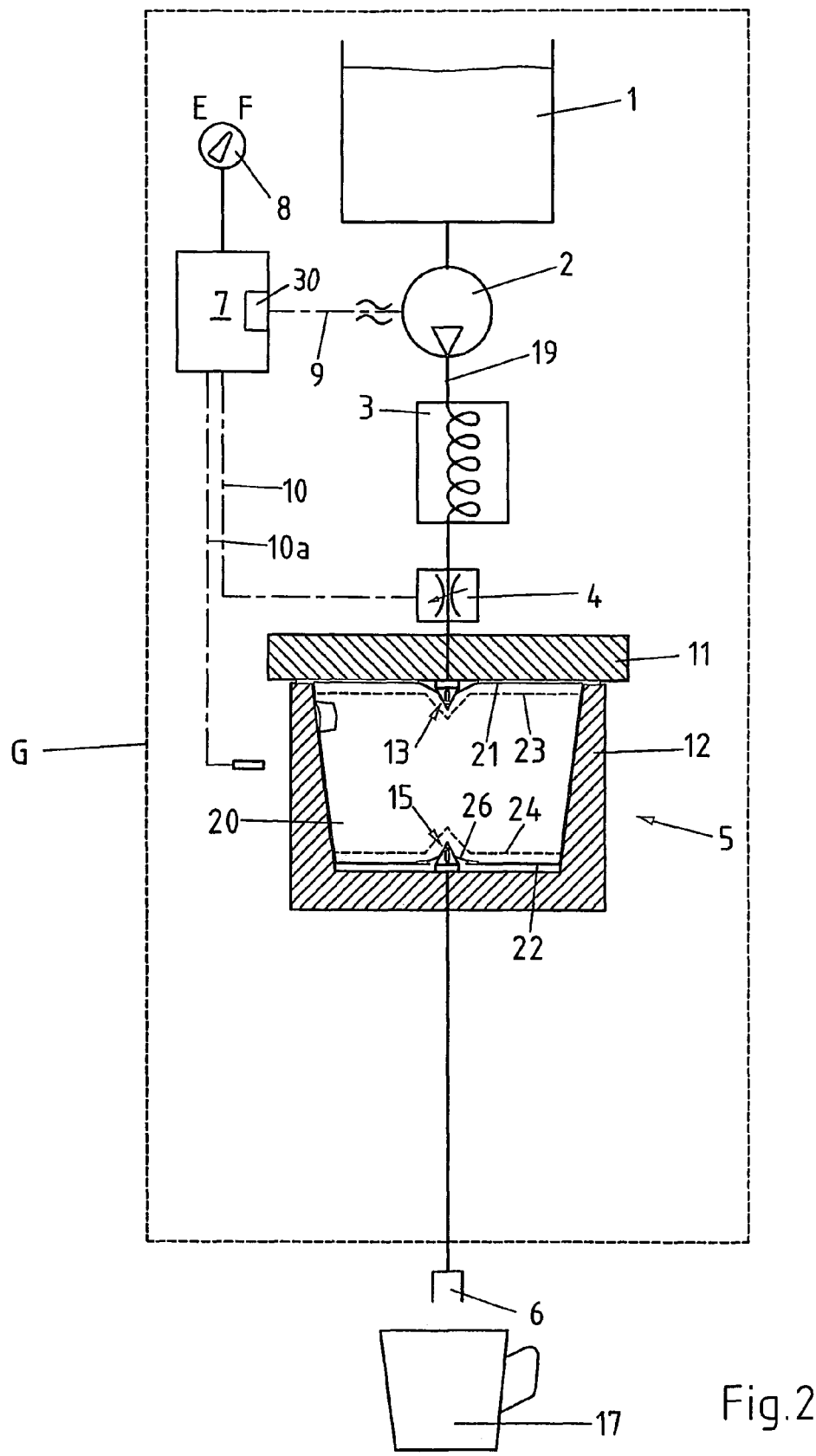
FIG. 2 shows a schematic diagram of a coffee maker with its brewing chamber closed.

Schematically shown in FIGS. 1 and 2 are the essential elements of the coffee maker according to the invention, namely a fresh water tank 1, a pump 2, a boiler 3, a throttle valve 4, a brewing chamber 5, a beverage outlet 6, a control unit 7 and a selector switch 8. All these elements are mounted inside a schematically indicated housing G. Located below the beverage outlet 6, there is shown a coffee mug 17 for receiving the prepared coffee beverage. The cartridge to be put into the brewing chamber 5 and containing ground coffee is designated by reference numeral 20. In the present example, the bottom 22 of the cartridge 20 is provided with an aperture 25 which is covered by a foil 26 provided at the inside of the bottom 22 of the cartridge 20. Since such a cartridge is primarily suitable for preparing filter coffee, it is designated, in the following, as a filter cartridge 20, while a conventional cartridge having a continuous bottom without any opening is designated as an espresso cartridge.

The brewing chamber 5 comprises an upper closing plate member 11 and a lower cartridge retainer 12. The inner contour of the cartridge retainer 12 essentially corresponds to the outer contour of the filter cartridge 20. In the drawings, both the closing plate member 11 and the cartridge retainer 12 are shown in a cross sectional view. The cartridge retainer 12 is movable in vertical direction, as shown by the double-arrow 18. The means for moving the cartridge retainer up and down, as well as possibly provided means for feeding and removing a cartridge, are not shown since the design thereof is well within the skill of a professional person.

Both the lower surface of the closing plate member 11 and the bottom of the cartridge retainer 12 are provided with a punching member 13 and 15, respectively. Thereby, the upper punching member 13 serves for punching the cover 21 of the cartridge 20, while the lower punching member 15 serves for punching the bottom 22 of the cartridge 20. Both punching members 13 and 15, respectively, are located centrally on the closing plate member 11 and the bottom of the cartridge retainer 12, respectively. Moreover, both punching members 13 and 15, respectively, comprise a conically shaped front portion comprising a number of slots 14 and 16, respectively, through which the brewing water can flow into the cartridge 20 and the prepared coffee beverage can flow out of the cartridge 20, respectively.

The selector switch 8 serves for selecting the coffee beverage to be prepared. The letter "E" denotes espresso coffee, while the letter "F" denotes filter coffee. The selector switch is electrically connected to the control unit 7. The control unit is operationally connected to the pump 2 via a conductor 9 and to a throttle valve 4 via a conductor 10. The throttle valve is inserted into a brewing water conduit 19 running from the pump 2 to the closing plate member 11. Moreover, there is provided a sensor 28, electrically connected to the control unit 7 by means of a conductor 10a. The sensor 28 serves for detecting and reading a label or marking 27, provided on the cartridge 20 and containing information about the kind and/or content of the cartridge 20. Such a label or marking 27 can consist, for example, of a barcode printed onto the cartridge 20; however, other kinds of markings are possible, for example in electronic form. It is understood that the sensor 28 and the label or marking 27 are matched to each other to enable the sensor 28 to read the label or marking 28 and to forward the information contained therein to the control unit 7. In the case where exclusively cartridges 20 are used that are provided with such a label or marking 28, the selector switch 8 can be omitted since the kind of cartridge 20 is automatically recognized by the sensor 27, and the control unit, consequently, influences certain operating parameters of the coffee maker, e.g. the delivery rate of the pump 2, the adjustment of the throttle valve 4 et cetera.

The brewing operation using a cartridge designated for preparing a froth-less coffee beverage, a so-called filter coffee, takes place as follows:

The selector switch 8 is manually rotated into the position "F" and the cartridge 20 is inserted into the cartridge retainer 12. Then, the retainer 12 is moved upwards towards the closing plate member 11. Upon completion of this upwards movement (see FIG. 2), both the cartridge cover 21 and the bottom 22 of the cartridge 20, i.e. the foil 26, are punched. Once the upper end position is reached, the closing plate member 11 not only closes the brewing chamber 5, but also presses the cartridge cover 21 against the top end face of the cartridge retainer 12 along an annular contact area, thereby hydraulically sealing the upper portion of the cartridge 20 against the bottom 22 of the cartridge 20. As soon as the brewing chamber 5 is closed, the pump 2 is operated. The amount of brewing water fed into the brewing chamber 5 per unit of time is restricted by the control unit 7, as compared to the brewing operation of an espresso coffee, to such an extent that the brewing water flows through the cartridge 20 essentially unpressurized. The flow restriction rate is determined either by a pre-selected, stored value or on the basis of a code contained in the label or marking 27 of the cartridge 20. The flow restriction can be realized by the control unit 7 either by reducing the flow rate of the pump 2 or by adjusting the throttle valve 4. Means 30 provided within the control unit for reducing the flow rate of the pump 2, in the case of an AC operated pump, may include a phase controlled modulator or a wave packet controller. As an alternative, the means 30 for reducing the flow rate of the pump 2 may be in the form of a device for changing the operating frequency of the pump 2. It is understood that in practice only one of the measures for reducing the flow rate of the brewing water flowing through the brewing chamber 5 per unit of time is provided, i.e. either means are provided for reducing the flow rate of the pump 2, or a throttle valve 4 is provided for reducing the effective flow cross sectional area. It is further understood that other means for reducing the flow rate of the brewing water flowing through the brewing chamber 5 per unit of time could be provided.

In any case, the previously mentioned means for reducing the flow rate of the brewing water flowing through the brewing chamber 5 per unit of time ensure that the flow rate, even without counter pressure, is reduced to not more than 12 liters per hour, preferable to 8 liters per hour.

Further important is that both the cover 21 of the cartridge 20 and the bottom 22 of the cartridge 20 are punched, i.e. provided with an aperture, before the brewing operation is initiated in order to ensure that no hydraulic pressure build-up can take place, which would lead to the formation of froth in the beverage.

As can be further seen in the drawings, the filter cartridge 20 is provided with an upper filter element 23 and a lower filter element 24. Such filter elements 23, 24 favor a consistent flow of the brewing water through the filter cartridge 20 and prevent the coffee powder contained in the cartridge 20 from escaping through the punched out apertures. The filter elements 23, 24 are provided each with a recess directed towards the interior of the cartridge 20 and located in the area where the cover 21 and the bottom 22, respectively, of the cartridge 20 are punched and into which the punching members 13, 15 extend once the cartridge cover 21 and bottom 22 are punched. In order to ensure that the bottom 22 of the cartridge 20 is reliably punched upon closing the brewing chamber 5, a foil 26 is provided which has a low ductility and a low tensile strength as compared to the material of the cartridge itself, such that it easily tears apart under the influence of the lower punching member 15 located at the bottom of the cartridge retainer 12.

For preparing a conventional espresso coffee, the selector switch 8 is manually rotated into the position marked "E". In this mode of operation, the brewing water flows through a conventional espresso cartridge under high pressure. In the present case, the expression "espresso coffee" shall mean a coffee beverage that is provided with a froth layer at its top, independent of the amount of brewing water used for preparing the coffee beverage. Preferably, for preparing a filter coffee, different cartridges are used than for preparing espresso coffee. Besides the different design of the bottom of the cartridge, also the coffee powder blend, the amount of coffee powder and/or the degree of grinding can be different. Moreover, in the case of a filter coffee cartridge, the apertures in the filter elements 23, 24 are larger and/or their number is increased, such that these filter elements 23, 24 do not constitute a hydraulic resistance to the brewing water flowing there trough.

As an alternative to the embodiment discussed herein before, the coffee maker can incorporate more extensive features: For example, means can be provided to punch the bottom of the cartridge later than the cover of the cartridge, depending on the kind of coffee beverage to be prepared. In case an espresso coffee is to be prepared, the bottom of the espresso cartridge is punched only after a certain hydraulic pressure has been built up in the interior of the cartridge, because this measure favors the formation of froth, as is well known.

Alternatively, in the case of an espresso cartridge, its bottom can be punched by the lower punching member in a first phase only partially, i.e. to such an extent that the tip of the punching member just penetrates the bottom of the cartridge, but only so far that the slots 16 of the punching member 15 do not communicate with the interior of the espresso cartridge. In this way, a hydraulic overpressure can be built up in the interior of the espresso cartridge during a first phase of the brewing operation.

On the other hand, in brewing a coffee beverage with the help of a filter cartridge, both the cover and the bottom of the latter one are punched before the real brewing operation starts in order to avoid a hydraulic overpressure in the interior of the filter cartridge which would favor the formation of froth.

The coffee maker according to the invention is known under the designation "espresso machine"; it is suitable both for preparing a filter coffee beverage and particularly an espresso coffee beverage. The coffee maker can be designed as a manually operated machine, with a cartridge holder to be manually inserted into the machine, or as a semi- or fully-automatic coffee maker.

For realizing the aforementioned measures, for example the lower punching member 15 located at the bottom of the cartridge retainer 12 can be vertically adjustable. The height position adjustment thereof can be performed by means of an electric motor or an electro magnet, under the control of the common control unit 7.

What is claimed is:

1. Coffee maker for brewing coffee powder contained in a cartridge, comprising:
   a single brewing chamber adapted to receive said coffee powder cartridge;
   at least one means for punching said coffee powder cartridge;
   a pump for feeding hot brewing water through a single brewing water conduit into said brewing chamber, wherein said pump is operated with alternating current;
   means for restricting the amount of brewing water fed into said brewing chamber per unit of time to such an extent that the brewing water flows through said powder coffee cartridge received in said brewing chamber essentially unpressurized, said means for restricting including an adjustable throttle valve inserted into said brewing water conduit for varying the effective cross sectional flow area of said conduit, wherein said means for restricting the amount of brewing water fed into said brewing chamber per unit of time comprises means for restricting a flow rate of said pump, and wherein said means for restricting the flow rate of said pump comprises a phase controlled modulator, a wave packet controller or a controller for changing the frequency; and
   a control unit operationally connected to said pump and said means for restricting to selectively activate said pump and said means for restricting, in a first state to direct pressurized water into said brewing chamber sufficient for preparing an espresso beverage and in a second state to direct essentially unpressurized water into said brewing chamber sufficient for preparing a frothless beverage.

2. Coffee maker according to claim 1 in which said means for restricting the amount of brewing water restrict the amount of brewing water fed into said brewing chamber per unit of time to not more than 12 liters per hour.

3. Coffee maker according to claim 1 in which at least two punching members are provided for punching the bottom of the cartridge as well as the cover of the cartridge, whereby means are provided for punching said bottom and said cover of said cartridge by said punching members before brewing water is fed to the cartridge by means of said pump.

4. Coffee maker according to claim 1 in which said brewing chamber comprises a cartridge retainer and a closing plate member, both said cartridge retainer and said closing plate member being provided each with a punching member, said coffee maker further comprising means for moving said cartridge container and said closing plate member relative to each other from an open condition of said brewing chamber to a closed condition thereof, whereby said cartridge contained in said brewing chamber is punched at its cover and its bottom by means of said punching members upon closing said brewing chamber.

5. Coffee maker according to claim 4 in which said closing plate member and said cartridge retainer both are provided with a centrally located punching member.

6. Coffee maker according to claim 4 in which said closing plate member or said cartridge retainer is provided with a centrally located punching member.

7. Coffee maker according to claim 1 in which a manually operated selector switch is provided that is connected to said control unit for selecting pressurized or unpressurized flow of brewing water.

8. Coffee maker according to claim 4 in which said closing plate member is adapted to press said cartridge along an annular seating area against the end face of said cartridge retainer upon closing said brewing chamber.

9. Coffee maker according to claim 1, further comprising at least one sensor for decoding a label or marking provided on said cartridge, whereby said sensor is operationally connected to said control unit for selecting pressurized or unpressurized flow of brewing water in response to the information content of said label or marking.

10. A coffee powder cartridge adapted to be used in a coffee maker according to claim 1, the bottom of said cartridge comprising an aperture covered by a foil fixed to the inner side of said bottom.

11. A coffee powder cartridge according to claim 10, the cartridge comprising a cup shaped lower portion, the bottom thereof constituting the cartridge bottom, whereby the foil covering the aperture provided in the cartridge bottom is made of a material that has a lower ductility and a lower tensile strength than the material of the cup shaped lower portion to ensure that the foil reliably tears open under the influence of a punching member upon closing the brewing chamber.

\* \* \* \* \*